United States Patent
Sato et al.

[11] Patent Number: 5,828,656
[45] Date of Patent: Oct. 27, 1998

[54] METHOD OF CONTROLLING COMMUNICATIONS, AND ELECTRONIC DEVICE

[75] Inventors: Makoto Sato, Tokyo; Hisato Shima, Kanagawa, both of Japan

[73] Assignee: Sony Corporation, Tokyo, Japan

[21] Appl. No.: 678,044

[22] Filed: Jul. 10, 1996

[30] Foreign Application Priority Data

Jul. 12, 1995 [JP] Japan .................................. 7-199145

[51] Int. Cl.[6] .................................................. H04L 12/28
[52] U.S. Cl. ........................................ 370/254; 370/257
[58] Field of Search .................................... 370/254, 257, 370/255, 258, 432, 461, 462

[56] References Cited

U.S. PATENT DOCUMENTS

| | | | |
|---|---|---|---|
| 5,343,475 | 8/1994 | Matsuda et al. | 371/33 |
| 5,357,525 | 10/1994 | Moriue et al. | 371/32 |
| 5,499,847 | 3/1996 | Matsuda et al. | 371/32 |
| 5,563,886 | 10/1996 | Kawawmura et al. | 370/257 |

*Primary Examiner*—Ajit Patel
*Attorney, Agent, or Firm*—Frommer Lawrence & Haug LLP; William S. Frommer

[57] ABSTRACT

The invention provides a method of controlling communication in a communication system using a P1394 serial bus, and an electronic device for use in such a communication system, in which even if the system configuration in terms of connections of electronic devices changes when transmission of an information signal is in progress, the communication operation is controlled so that the time period is efficiently used. In the control of the input/output of the information signal, the time period required for transmitting the information signal is divided into a part which changes depending on the system configuration in terms of connections of electronic devices, and the other part which changes depending on the type of the information signal, so that these two parts are controlled separately. The electronic device is provided with a register for separately storing the part which changes depending on the system configuration in terms of connections of electronic devices and the other part which changes depending on the type of the information signal. More specifically, in the case of an output plug control register, these two parts are separately stored in an overhead ID field and a max payload size field.

6 Claims, 6 Drawing Sheets

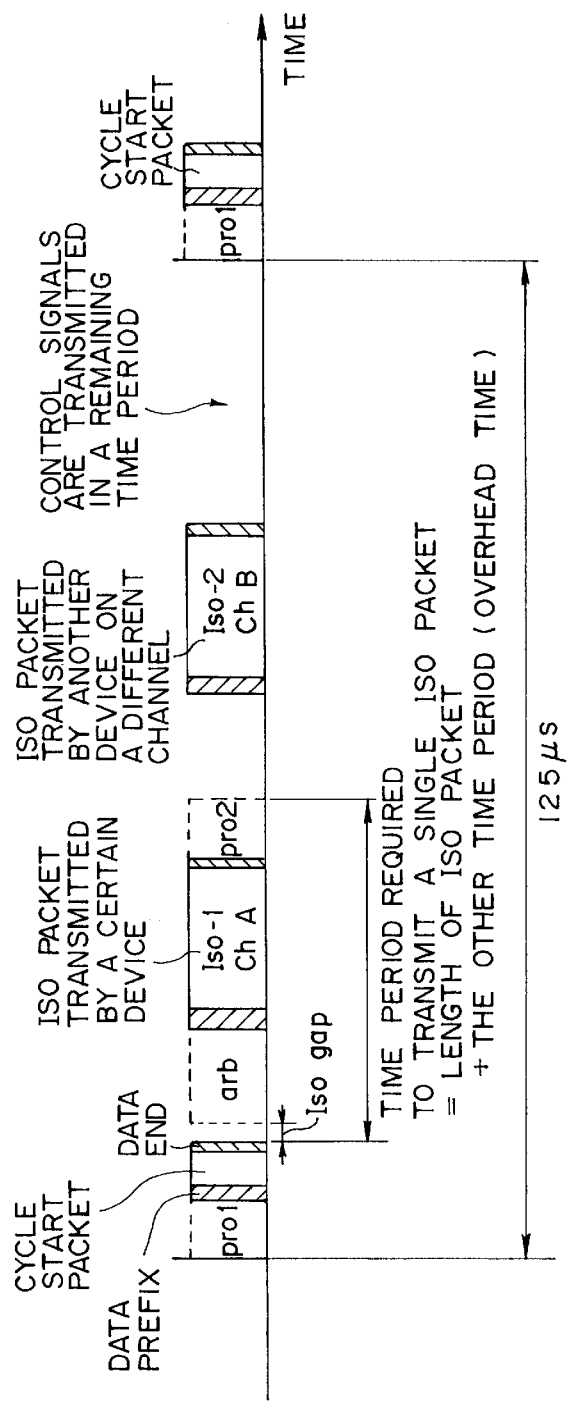

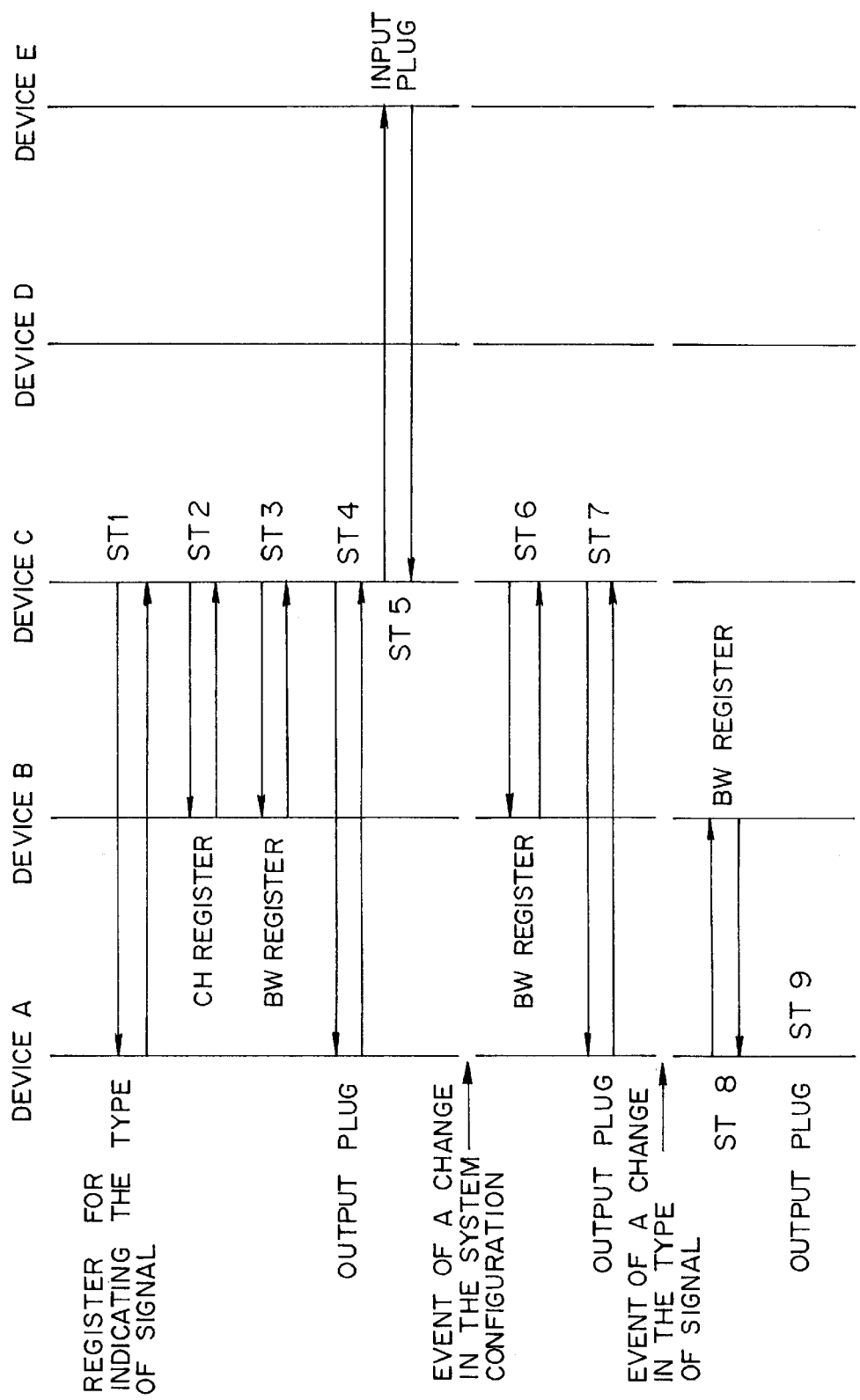

METHOD OF CONTROLLING COMMUNICATIONS, AND ELECTRONIC DEVICE

BACKGROUND OF THE INVENTION

1. Field of the Invention

The present invention relates to a system including a plurality of electronic devices connected to each other via a bus which allows transmission of a mixture of control signals and information signals, so that they can communicate with each other via that bus, and more specifically, to a technique of making more efficient use of communication time periods which are common resources of the bus.

2. Description of the Related Art

In the art of a communication system including a number of electronic devices, it is known to employ a P1394 serial bus, which allows transmission of a mixture of control signals and information signals, so as to connect electronic devices or equipment such as a video tape recorder, a television receiver, a video tape recorder integrated with a camera, a computer, etc., so that control signals and information signals may be transmitted among these electronic devices (hereafter also referred to simply as devices).

Referring to FIG. 4, a specific example of such a communication system is described blow. In the example shown in FIG. 4, the communication system includes devices A to E which are connected via a P1394 serial bus between devices A and B, between devices B and C, between devices C and D, and between devices C and E.

In communication systems using a P1394 serial bus, communication is performed at predetermined communication cycles (for example at 125 $\mu$s). This type of communication system allows two types of communications: isochronous communication in which an information signal such as a digital audio/video signal is continuously transmitted; and asynchronous communication in which a control signal such as a connection control command is transmitted irregularly as required.

Communication cycles performed via the bus are controlled by a device which has become a route in the communication system (hereafter such a device will be referred to as a route node) wherein a cycle is started by sending a start packet over the bus from the route node. The route node is assigned automatically, when the bus is reset, according to the scheme prescribed by the specifications of IEEE-P1394.

FIG. 5 illustrates an example of a communication cycle in which the communication cycle is seen from a device which has succeeded in transmitting an isochronous packet first after a cycle start packet was sent over the bus. In FIG. 5, the cycle start packet transmitted over the bus by the route node arrives at other devices after a first propagation delay time pro-1. If the cycle start packet has arrived, a device which desires to send an isochronous packet over the bus waits for a predefined period of time (isochronous gap) and then requests the route node to allow it to use the bus. If a plurality of devices has issued similar requests, the route node gives permission to a device which has issued a request earliest. The above operation is performed during the arbitration time shown in FIG. 5.

The device which has obtained the permission on usage of the bus from the route node, starts transmission of an isochronous packet (Iso-1 in FIG. 5) over the bus. In the transmission of the isochronous packet, codes representing a data prefix and a data end are placed at the start and end positions of the isochronous packet, respectively.

If the above device which has succeeded in obtaining the permission to use the bus has completed the transmission of the isochronous packet, and the isochronous packet has arrived in a second propagation delay time pro-2, then those devices which could not obtain the permission on usage of the bus reissue a request for use of the bus to the route node after waiting until a predefined amount of isochronous gap has elapsed from the arrival of the isochronous packet. If a certain device has succeeded in obtaining permission on use of the bus, the device transmits an isochronous packet (Iso-2 in FIG. 5) over the bus.

If all devices desiring to transmit an isochronous packet over the bus have completed their transmission of isochronous packets and arbitrations, the remaining period of time until the transmission of another cycle start packet is used for transmission of asynchronous packets. In the above operation, the second propagation delay time pro-2 is determined by the time required for a packet to propagate from a certain device to a most distant device in the communication system. Any device has the ability of calculating such the delay time when the communication system has been established and the bus has been reset, according to the procedure defined in the specifications of IEEE-P1394. However, the delay time varies from device to device, and therefore, to perform such a calculation, each device has to have information about all devices. This imposes a great load on the devices. Therefore, in practice, instead of calculating the delay time for each case, the delay time which occurs between two devices which are located at the most distant positions in the communication system is calculated, and this value is employed in common for all devices. This makes the management of communication simplified. On the other hand, the arbitration time is determined by the distance from the route node to each device. Therefore, the arbitration time varies depending on the device. The isochronous gap, the data prefix, and the data end each have a fixed value defined in the specifications of IEEE-P1394.

In the worst case (in which transmission occurs between two most distant devices), as can be seen from FIG. 5, the time period required for transmission of one isochronous packet becomes equal to the time from the beginning of the isochronous gap to the end of the second propagation delay time pro-2. The total time required for such transmission consists of the intrinsic length of an isochronous packet and other components including an isochronous gap, a data prefix, a data end, an arbitration time, and a second propagation delay time pro-2, wherein the sum of these components other than the intrinsic length of the isochronous packet is referred to as an overhead time. As can be seen from the above discussion, the overhead time varies depending on the combination of devices connected to each other (hereafter referred to as the system configuration).

First of all, a device which desires to transmit an isochronous packet over the bus has to obtain permission on usage of a particular time period and a channel for the transmission. For the above purpose, the device issues a request for usage of the desired channel and time period to the isochronous communication resource manager, that is the device responsible for managing the channels of the bus and transmission time periods over the entire system. The isochronous communication resource manager includes a channel register used to indicate the use of each channel of the bus, and a time period register used to indicate the remaining capacity of the bus (hereafter referred to as the remaining time period). A device which desires to transmit an isochronous packet transmits a write instruction (compare & swap instruction) to these registers using an asynchronous packet so that the channel and the time period the device wants to use are written in these registers. If the device succeeds in writing the above information, it becomes possible for the device to use the bus.

Each device has its own plug control register which controls the connection between devices so that the devices can perform isochronous packet communication. The information required for controlling the transmission of the isochronous packet and the information required for transmitting the isochronous packet are written into the plug control register so that the connection for the isochronous packet communication can be controlled by either the device itself or other external devices.

FIG. 6 illustrates the structure of the output plug control register. In FIG. 6, if the validity flag is set to "1", transmission of an isochronous packet is started using the channel designated by the channel field of the register and using the time period designated by the bandwidth field at the transmission rate designated by the data rate field. If the validity flag is reset to "0", the transmission is stopped. The connection counter indicates the number of devices which are receiving the isochronous packet output by that device. In the case where the device itself has started the transmission of the isochronous packet, the unowned connection counter is set to "1". Of the information described above, the information stored in the validity flag, the unowned connection counter, and the connection counter are used to control the isochronous packet transmission. On the other hand, the information stored in the channel field, the data rate field, and the bandwidth field are used to transmit the isochronous packet. In FIG. 6, the numerals placed on the respective fields represent the data length (in bits) of each field.

The input plug control register has a similar structure. In this case, if the validity flag is set to "1", the reception of an isochronous packet via the channel designated by the channel field of the input plug control register is started. If the validity flag is reset to "0", the reception is stopped.

The connection control procedure will be described below with reference to FIG. 8 for a case where the output of a device A is input to a device E under the control of a device C in a communication system having a configuration such as that shown in FIG. 7. Such a situation can occur for example when the reproduction signal of the device A is recorded on the device E wherein the device C is an edit controller, and the devices A and E are video tape recorders. In this communication system, the device B serves as the isochronous communication resource manager.

First of all, the device C examines the type of the information signal to be transmitted from the device A over the bus (step 1). In this case, the type of the information signal transmitted from the device A is written in a particular register provided in the device A. Then the channel via which the device A is going to output the isochronous packet over the bus is written in a channel register of device B (step 2). Furthermore, the sum of the time period required for transmitting the isochronous packet determined in step 1 and the overhead time described above is subtracted from the remaining time period indicated by the time period register of the device B (step 3). As a result, the channel and time period are reserved for use by the device A to output the isochronous packet over the bus.

If the channel and the time period have been reserved in the above-described manner, the information required for controlling the transmission of the isochronous packet and the information required for transmitting the isochronous packet are written in the output plug control register of the device A and also in the input plug control register of the device E (steps 4 and 5). Then the isochronous packet is output from device A to the bus and input to the device E via the devices B and C.

In the above communication system, if some device is removed from or added to the system when the transmission from the device A to the device E is in progress, then the connection control operation will be performed as follows. In this case, the system configuration is changed, and a corresponding change occurs in the overhead time although the intrinsic time period required for the device A to transmit an isochronous packet remains unchanged. The device C recalculates the time period taking into account the change in the overhead time, and subtracts the recalculated overall transmission time period from the remaining time period indicated by the time period register of the device B (step 6). Furthermore, the above-described new transmission time period is also written into the output plug control register of the device A (step 7). Now, the connection control operation will be discussed for the case in which the type of the signal output from the device A is changed during the transmission from the device A to the device E. In this case, the intrinsic time period required for the device A to transmit the isochronous packet changes although the overhead time remains unchanged. The device A recalculates the transmission time period to compensate for the change in the intrinsic time period for the isochronous packet and subtracts the recalculated overall time period from the remaining period of time indicated by the time period register of the device B (step 8). Furthermore, the above recalculated transmission time period is also written into the output plug control register of the device A (step 9).

The above procedure is performed as a transaction consisting of a compare & swap instruction and a response prescribed in the specifications of the IEEE-P1394 standard (step 1 may also be performed using a read instruction and a response).

However, in the above-described connection control procedure, it is required that the device C know the overhead time determined by the structure of the bus, and furthermore, the device C have to perform some control communication so as to obtain the knowledge about the type of the information signal output by the device A thereby knowing the intrinsic period of time required for the data packet, and thus specifying the overall time period including these components.

In the above connection control procedure, however, the correction in terms of the overhead time, which should be made when the configuration of the communication system is changed when communication is in progress, can be made only by the device that knows the initial setting parameters (the device C in this specific example). On the other hand, if the type of the information signal is changed when communication is in progress, only the device A can make correction in terms of the intrinsic period of time required for the data packet.

In order that other devices can also make correction for any case, devices have to communicate in terms of control signals with the device A or C as required. However, the additional time spent for that communication in terms of control signals can break the communication of the information signal. Furthermore, the control procedure becomes complex, and therefore it becomes difficult to develop applications which use plugs and control registers.

In view of the above, it is an object of the present invention to provide a method of controlling communication in a communication system, and electronic devices for use in such a communication system, which have no longer the above problems.

SUMMARY OF THE INVENTION

According to an aspect of the present invention, there is provided a method of controlling communication in a communication system including a plurality of electronic devices connected to each other via a bus which allows transmission of a mixture of control signals and information signals, the method being characterized in that in the control of the input/output of the information signal, a time period required for transmitting the information signal over the bus is divided into a part which changes depending on the system configuration in terms of connections of electronic devices, and the other part which changes depending on the type of said information signal, so that said two parts are controlled separately.

In one mode of the invention, a register for storing a control code used to control the input/output of the information signal is provided in each electronic device so that the register of each electronic device may be accessed for reading and writing operations by any electronic device in the communication system, wherein the time period required for transmitting the information signal is divided into a part which changes depending on the system configuration in terms of connections of electronic devices, and the other part which changes depending on the type of said information signal, and these two parts are separately stored in the above-described register.

In another mode of the invention, the part which changes depending on the type of the information signal is stored in the above-described register even when no information signal is output so that the register indicates the time period which will be required if an information signal is output. With this arrangement, the device which establishes the signal path can know the time period required for communication only by reading the value representing the required time period from the above-described register without having to know the type of the information signal to be transmitted. On the other hand, in the case where it is attempted to obtain permission on usage of a particular time period for particular communication by accessing a certain register using a compare & swap instruction defined in the specifications of the IEEE-P1394 standard, present values are read in a first step and the values are written in a second step regardless of which register is accessed. This means that the first step is no longer required in the procedure according to the present invention.

In still another mode of the invention, if the system configuration in terms of connections of the devices changes when the transmission of an information signal is progress, the time period reserved for the transmission of that information signal is adjusted to a correct value the value stored in the register representing the part of the time period which changes depending on the system configuration is updated. The above adjustment of the time period and the updating may be performed by any device in the communication system.

In another mode of the invention, if the type of an information signal is changed when the transmission of the information signal is in progress, then the device outputting the information signal adjusts the time period reserved for the transmission of the information signal to a correct value and further updates the value stored in the register representing the part of the time period which changes depending on the type of the information signal.

BRIEF DESCRIPTION OF THE DRAWINGS

FIG. 5 is a time chart illustrating an example of a communication cycle using a P1394 serial bus;

FIG. 6 is a schematic representation of an example of a conventional output plug control register;

FIG. 8 is a schematic representation of an example of a connection control procedure using an output plug control register according to a conventional technique.

DESCRIPTION OF THE PREFERRED EMBODIMENTS

Figure 1:
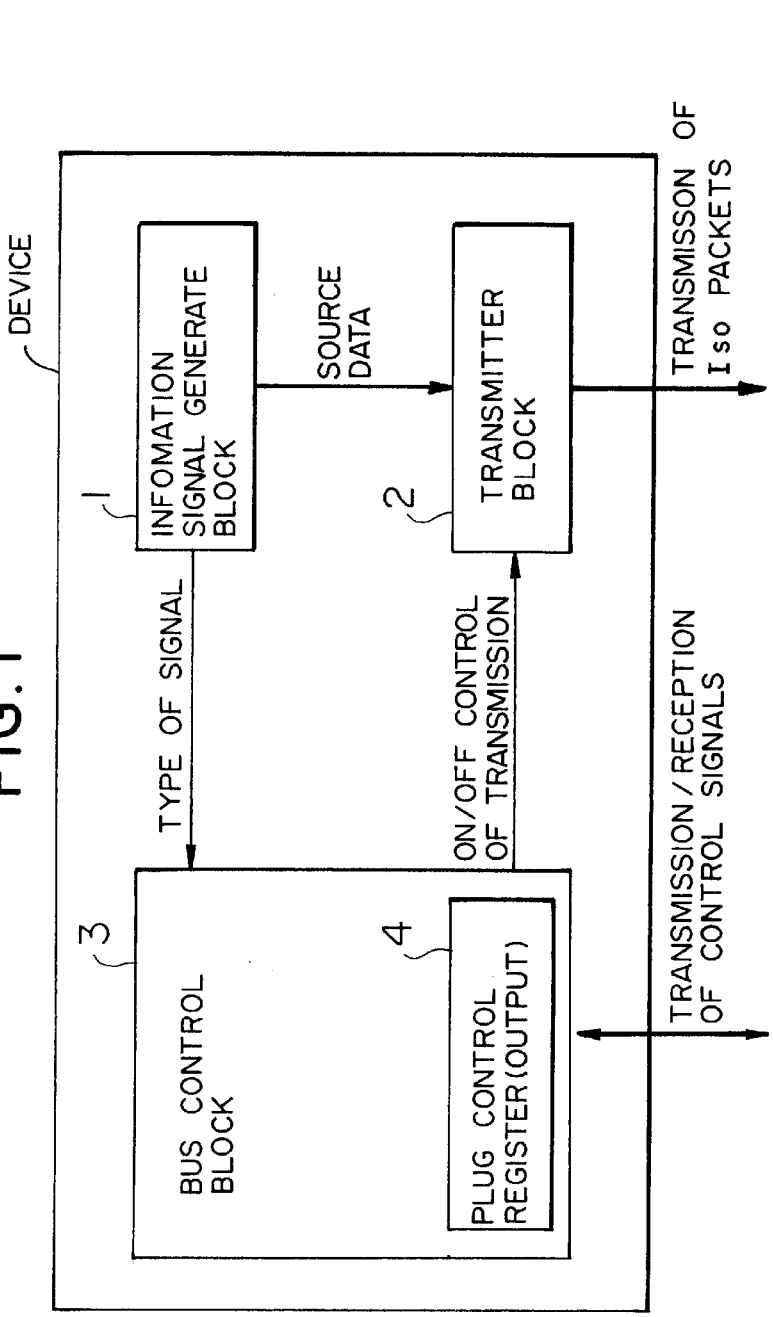
FIG. 1 is a block diagram illustrating the construction of main parts of a device according to the present invention.

Referring to the accompanying drawings, preferred embodiments of the present invention will be described in detail below. FIG. 1 is a block diagram illustrating the construction of main parts of a device according to the present invention. In this invention, as shown in FIG. 1, the device includes an information signal generator block 1, a transmitter block 2 for converting the source data of the information signal generated by information signal generation block 1 into a packet and then transmitting the resultant packet; and a bus control block 3 for transmitting and receiving a control signal.

The information signal generator block 1 generates an information signal such as a digital audio/video signal. In the case of a digital VTR, the information signal generator block 1 corresponds to the deck. The information signal generator block 1 informs the bus control block 3 of the type of the information signal being generated.

The transmitter block 2 converts the source data sent from the information signal generator block 1 into an isochronous packet, and transmits the resultant isochronous packet over the bus. In this operation, the bus control block 3 controls the transmission of the packet in an on/off fashion.

The bus control block 3 performs: analysis of the configuration of the communication system; analysis of the type of information signal transmitted from the information signal generator block 1; assignment of a particular time period to particular communication; setting of the plug control register; and on/off control of the transmission operation performed by the transmitter block 2. The bus control block 3 is provided with plug control registers for storing the information required for controlling the transmission of the isochronous packet and also the information required for transmitting the isochronous packet. In this specific example, since the operation of transmitting an isochronous packet is discussed, only the output plug control register is shown in FIG. 1.

Figure 2:
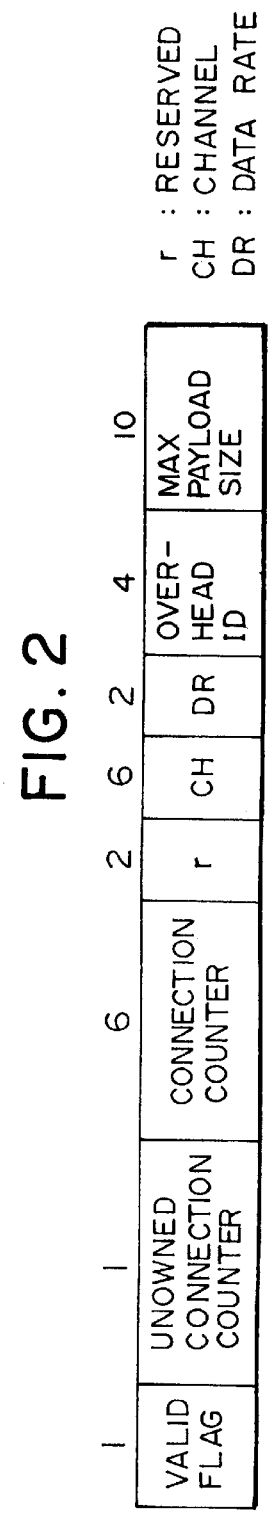
FIG. 2 is a schematic representation of the structure of an output plug control register according to the present embodiment.
Figure 3:
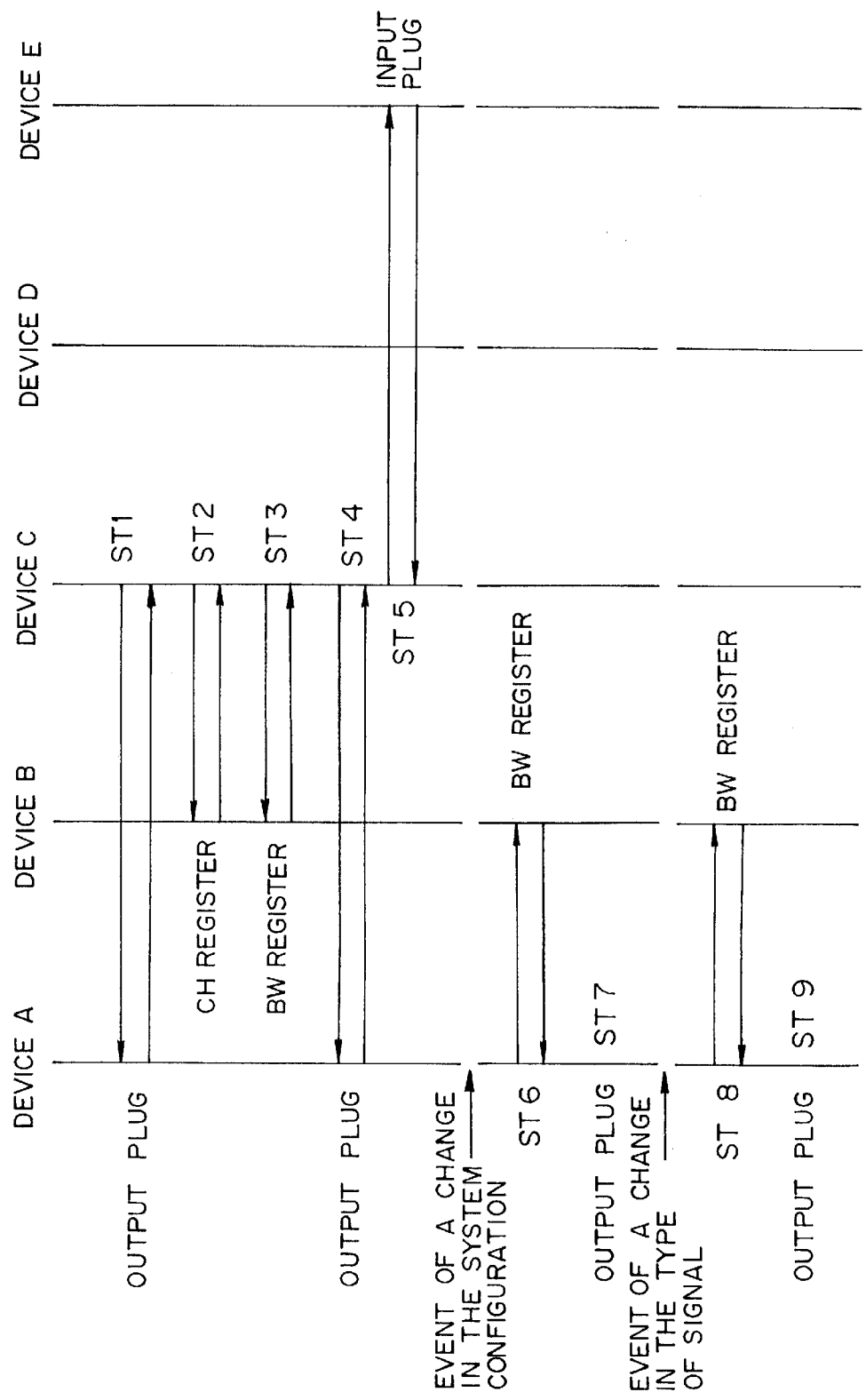
FIG. 3 is a schematic representation of an example of connection control procedure using the output plug control register according to the present invention.
Figure 4:
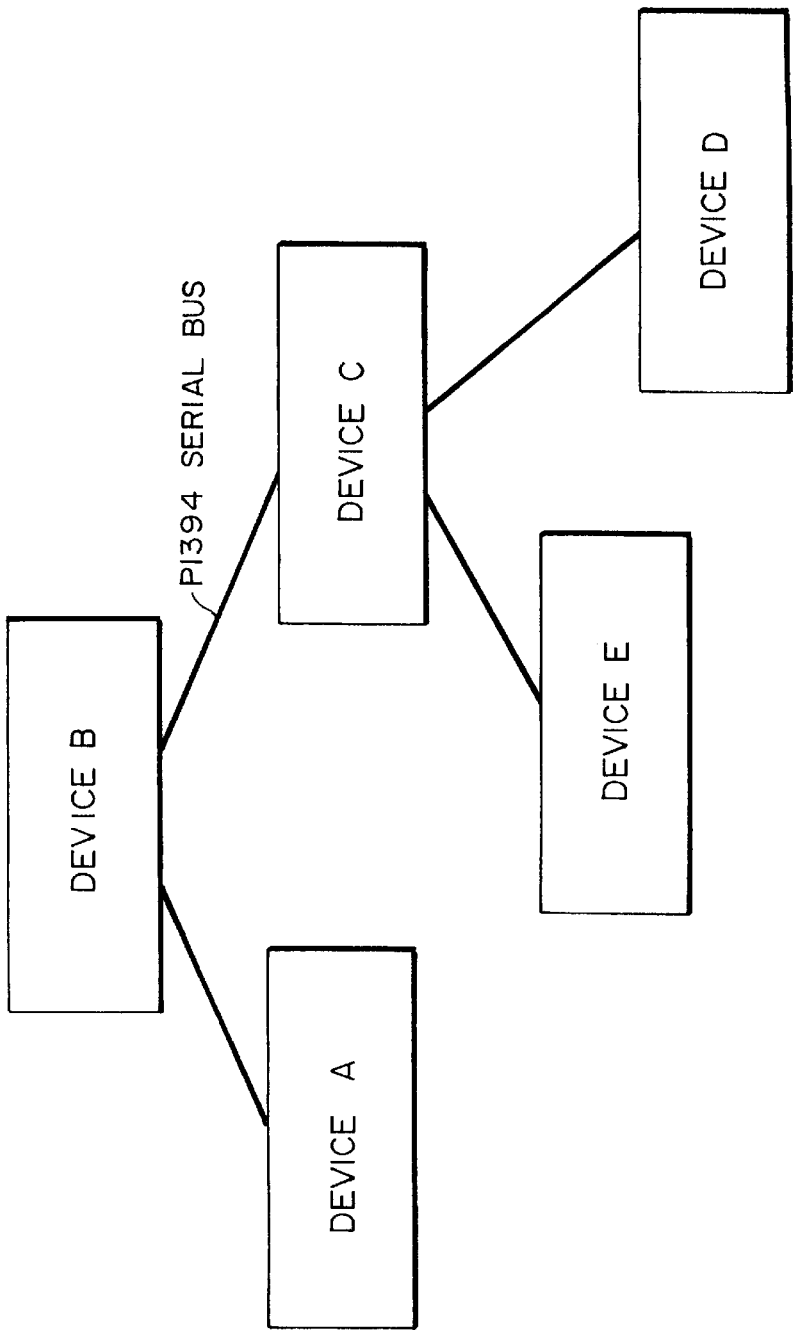
FIG. 4 is a block diagram illustrating an example of the configuration of a communication system including a P1394 serial bus.

FIG. 2 shows the output plug control register employed in the present embodiment. The field which is used to indicate the bandwidth in the conventional output plug control register shown in FIG. 6 is, in this embodiment, divided into two fields: an overhead ID field and a max payload size field, wherein the former varies depending on the system configuration in terms of connections of electronic devices and the latter varies depending on the type of the information signal.

The overhead ID is a value corresponding to the overhead time period wherein the actual overhead time period is equal to 32 times the ID value. The max payload size indicates the maximum amount of the isochronous packet transmitted cycle by cycle, represented in units of quadlets (4 bytes). The unit of the transmission time period is the time required for transmitting 32 bits at a transmission rate of S1600 (about 1600 MBPS). Therefore, when transmission is performed at S1600, the value of the max payload size directly indicates the intrinsic transmission time period for the data packet.

From these two parameters, the overall transmission time period can be calculated as follows: Overall transmission time period=(Overhead ID)×32+(Max payload size+3)×k. In the above equation, 3 quadlets are added to the max payload size so that the header and CRC of the isochronous packet are incorporated into the result. Furthermore, k is a coefficient depending on the data rate, which represents the factor of the transmission time period relative to the transmission time period at a reference data rate equal to S1600. For example, when the data is equal to S100, k×16.

Figure 7:
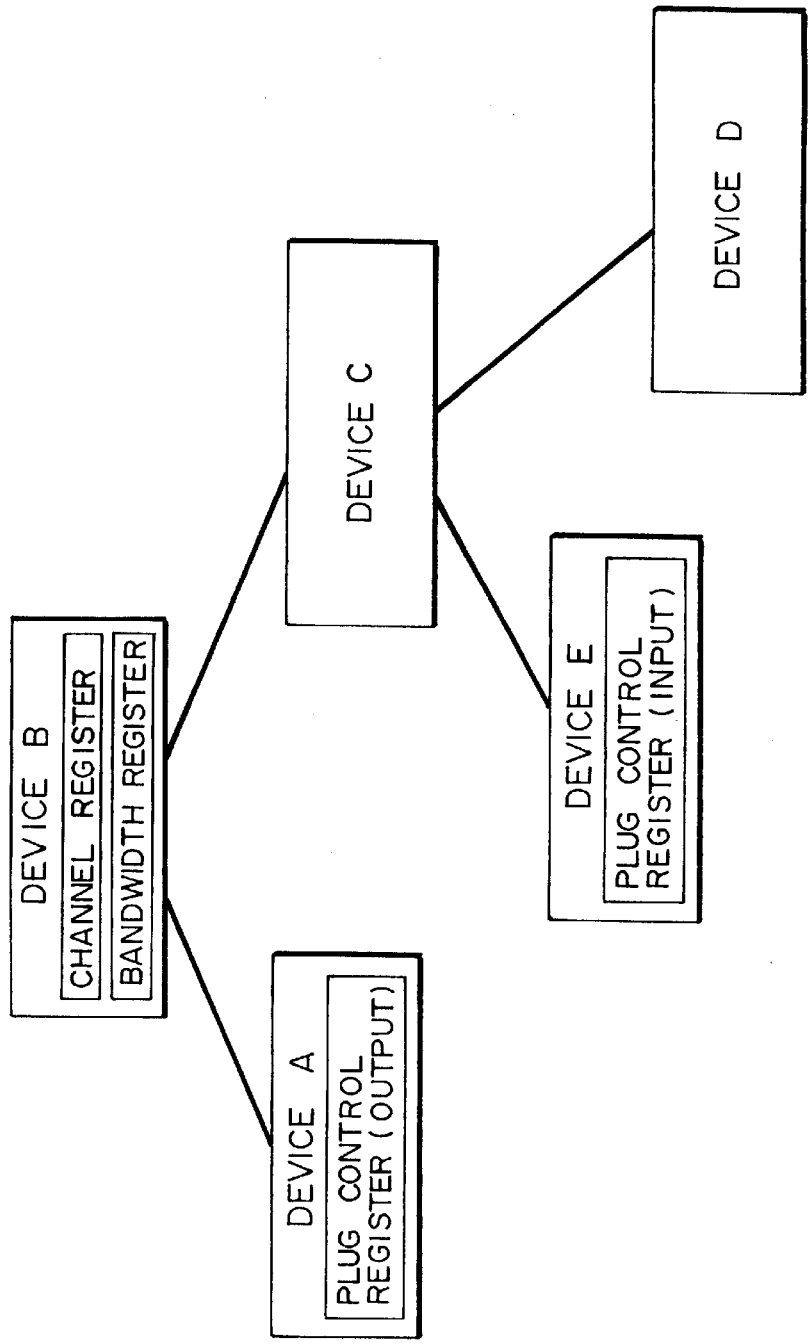
FIG. 7 is a block diagram illustrating an example of a conventional communication system in which connections of information signals are controlled using an output plug control register.

When the communication system has a configuration such as that shown in FIG. 7, the connection control procedure will be described below with reference to FIG. 8 for a case in which the output of a device A is input to a device E under the control of a device C. In this specific example, it is assumed that the device A is constructed as shown in FIG. 1, and that the device A has an output plug control register such as that shown in FIG. 2. The device E also has a similar structure in which there are provided a receiver block and an input plug control register.

At a first step of the connection control procedure, the device C reads the value of max payload size stored in the output plug control register of the device A. Then the channel which is to be used by the device A to transmit the isochronous packet over the bus is written in the channel register of the device B (step 2). Furthermore, the sum of the value of the max payload size obtained in the above step 1 and the overhead time is subtracted from the remaining time period indicated by the time period register of the device B (step 3). As a result, the particular channel and time period are reserved for use by the device A to transmit the isochronous packet over the bus.

If the channel and time period have been successfully reserved in the above-described manner, the information required for controlling the transmission of the isochronous packet and the information required for transmitting the isochronous packet are written into the output plug control register of the device A and into the input plug control register of the device E (steps 4 and 5). Upon the completion of the above process, transmission starts and the isochronous packet output from the device A over the bus is input to the device E after passing through the devices B and C.

In the above communication system, if some device is removed from or added to the system when the transmission from the device A to the device E is in progress, then the connection control operation will be performed as follows. In this case, the system configuration is changed, and a corresponding change occurs in the overhead time although the intrinsic transmission time period required for the device A to transmit the isochronous packet remains unchanged. The device A recalculates the transmission time period taking into account the change in the overhead time, and subtracts the recalculated transmission time period from the remaining time period indicated by the time period register of the device B (step 6). Furthermore, the new overhead ID recalculated in the above step is written into the output plug control register of the device A (step 7).

Now, the connection control operation will be discussed for the case in which the type of the signal output from the device A is changed when the transmission from the device A to the device E is in progress. Such the change in the type of the information signal may occur for example when the type of the digital video signal is changed from SD to HD or when the transmission rate of the compressed video signal according to the MPEG standard is changed. In this case, the intrinsic time period required for the device A to transmit the isochronous packet changes although the overhead time remains unchanged. The device A recalculates the intrinsic time period for the isochronous packet and subtracts the corrected overall transmission time period from the remaining time period indicated by the time period register of the device B (step 8). Furthermore, the new max payload size recalculated in the above step is written into the plug control register of the device A (step 9).

In the above connection control procedure, as in the case of FIG. 8 the procedure is performed as a transaction consisting of a compare & swap instruction and a response prescribed in the specifications of the IEEE-P1394 standard (step 1 may also be performed using a read instruction and a response).

In the present embodiment of the invention, as described above, if the system configuration in terms of connections of devices is changed the above change is detected by the bus control block 3 and in the case in which the transmission time period is insufficient for the new system configuration, the transmission time period is increased by the isochronous communication resource manager, while when the transmission time period is excessive, the isochronous communication resource manager reduces the transmission time period to a correct value. Furthermore, the value stored in the overhead ID field of the output plug control register 4 of the device A is updated.

On the other hand, if the type of the signal generated by the information signal generator block 1 is changed, the bus control block 3 is informed of the event of the change in the type of the signal so that the time period is adjusted in a similar manner to the above operation. Furthermore, the value stored in the max payload size field of the output plug control register 4 of the device A is updated.

After that, if the transmission path (channel and time period) is released from the device C, the transmission time period indicated by the output plug control register of the device A is returned to the isochronous communication resource manager thereby ensuring that the transmission time period which is a common resource of the bus can be controlled without contradiction.

When no signal is output, the max payload size indicates the intrinsic time period required for transmission of a signal of the present type. Therefore, when it is required to establish a signal path, the device C can know the transmission time period to be reserved only by reading the value stored in the max payload size field of the output plug control register without having to know the type of the information signal to be output by the device A.

In the specific example described above, when the system configuration in terms of connections of devices is changed, the device A outputting the information signal makes correction in terms of the overhead time. However, the correction in terms of the overhead time may also be made by any device such as the device C or B in the communication system.

Furthermore, in the specific example described above, the device C executes the process associated with the reservation of time period. However, the device which desires to transmit an information signal, that is the device A in the above specific example, may also execute the process associated with the reservation of time period. Furthermore, in the above-described embodiment, the sum of the data prefix, the data end, the arbitration time, the second propagation delay time pro-2, and the isochronous gap is regarded as the overhead time. However, since the data prefix and the data end are constant regardless of the system configuration, these two components may be incorporated into the intrinsic time period associated with the isochronous packet and the overhead time may consist of the arbitration time and the second propagation delay time pro-2.

In the present invention, as described above in detail, the time period, which is a common resource of the communication system, is divided into two parts which are controlled separately: a part which changes depending on the system configuration in terms of connections of devices; and the other part which changes depending on the type of the information signal. This makes it easier to readjust the communication time period when the system configuration is changed, so as to make more efficient use of the time period.

The present invention can be applied to a system in which transmission paths of information signals are controlled using plug control registers so that the transmission paths may be optimized immediately when some change occurs in the information signal output from some device without having any break in the communication of the information signal.

Furthermore, when a first signal path is established, the device which is to establish the signal path can know the time period to be reserved for communication only by reading the plug control register without having to know the type of the information signal to be transmitted.

What is claimed is:

1. A method of controlling communication in a communication system including a plurality of electronic devices connected to each other via a bus which allows transmission of a mixture of control and information signals, said method comprising the steps of:

setting a first period of a time period required for transmitting an information signal depending on the system configuration in terms of connections of electronic devices; and setting a second period of said time period depending on the type of said information signal, so that said first and second periods are set separately.

2. A method of controlling communication, according to claim 1, wherein a register for storing a control code used to control the input/output of the information signal is provided in each electronic device so that the register of each electronic device may be accessed for reading and writing operations by any electronic device in the communication system, wherein the time period required to output said information signal is stored in said register.

3. A method of controlling communication, according to claim 2, wherein said second period which changes depending on the type of the information signal is stored in said register even when no information signal is output so that said register indicates the time period which will be required if an information signal is output.

4. A method of controlling communication, according to claim 2, wherein the system configuration in terms of connections of electronic devices is examined when an information signal is transmitted and said first period which changes depending on the system configuration in terms of connections of electronic devices is adjusted to a correct value according to the system configuration.

5. A method of controlling communication, according to claim 2, wherein if the type of the information signal changes during an outputting operation, said second period which changes depending on the type of the information signal is adjusted to a correct value.

6. An electronic device for use in a communication system including a plurality of electronic devices connected to each other via a bus which allows transmission of a mixture of control and information signals, said electronic device comprising:

a register for storing a control code used to control the input/output of an information signal wherein said register may be accessed for reading and writing operations by any electronic device in said communication system; and means for setting a first period of the time period required for transmitting said information signal depending on the system configuration in terms of connections of electronic devices, and setting a second period of said time period depending on the type of said information signal, wherein said first and second periods are stored separately in said register.

* * * * *